US010264599B2

(12) United States Patent
Zhang et al.

(10) Patent No.: US 10,264,599 B2
(45) Date of Patent: Apr. 16, 2019

(54) METHOD AND APPARATUS FOR TRANSMITTING WIRELESS LOCAL AREA NETWORK DATA

(71) Applicant: HUAWEI TECHNOLOGIES CO., LTD., Shenzhen, Guangdong (CN)

(72) Inventors: Jiayin Zhang, Shanghai (CN); Jun Zhu, Shanghai (CN); Yingpei Lin, Shanghai (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/249,795

(22) Filed: Aug. 29, 2016

(65) Prior Publication Data

US 2016/0366699 A1 Dec. 15, 2016

Related U.S. Application Data

(63) Continuation of application No. PCT/CN2014/093869, filed on Dec. 15, 2014.

(30) Foreign Application Priority Data

Feb. 27, 2014 (WO) ................ PCT/CN2014/072617
Dec. 3, 2014 (WO) ................ PCT/CN2014/092960

(51) Int. Cl.
*H04W 4/00* (2018.01)
*H04W 72/12* (2009.01)
(Continued)

(52) U.S. Cl.
CPC ....... *H04W 72/1273* (2013.01); *H04W 74/00* (2013.01); *H04W 84/12* (2013.01)

(58) Field of Classification Search
None
See application file for complete search history.

(56) References Cited

U.S. PATENT DOCUMENTS

2007/0086414 A1 4/2007 Jang et al.
2008/0227386 A1 9/2008 Dayal et al.
(Continued)

FOREIGN PATENT DOCUMENTS

CN 1889403 A 1/2007
CN 101479958 A 7/2009
(Continued)

OTHER PUBLICATIONS

Hua Yan et al. "A Physical Layer Solution for Tomlinson-Harashima Precoding in the Framework of LTE-Advanced," GC'12 Workshop: International Workshop on Cloud Base-Station and Large-Scale Cooperative Communications. 2012 IEEE. Total 6 pages.
(Continued)

*Primary Examiner* — Zewdu A Beyen
(74) *Attorney, Agent, or Firm* — Leydig, Voit & Mayer, Ltd.

(57) ABSTRACT

A method comprises constructing, by an access point (AP), a radio frame within a scheduling window, the radio frame including at least a preamble part compatible with an existing IEEE 802.11 preamble legacy preamble, a preamble part used in a next-generation IEEE 802.11 standard (HEW preamble), and the first downlink subframe (DL subframe); sending the Legacy preamble, the HEW preamble and the first DL subframe in the radio frame; receiving at least one uplink subframe (UL subframe) located after the first DL subframe; wherein each of the at least one UL subframes is triggered by one DL subframe located before the UL subframe.

21 Claims, 6 Drawing Sheets

(51) Int. Cl.
*H04W 74/00* (2009.01)
*H04W 84/12* (2009.01)

(56) References Cited

U.S. PATENT DOCUMENTS

| | | |
|---|---|---|
| 2010/0020732 A1 | 1/2010 | Gaddam et al. |
| 2010/0260114 A1 | 10/2010 | Vermani et al. |
| 2010/0278123 A1 | 11/2010 | Fong et al. |
| 2011/0051705 A1 | 3/2011 | Jones et al. |
| 2012/0026909 A1 | 2/2012 | Seok |
| 2012/0127899 A1 | 5/2012 | Ketchum et al. |
| 2012/0269069 A1 | 10/2012 | Porat et al. |
| 2013/0028138 A1* | 1/2013 | Hao ............... H04L 5/0051 370/254 |
| 2013/0107912 A1 | 5/2013 | Ponnampalam |
| 2015/0023335 A1* | 1/2015 | Vermani ............ H04B 7/0452 370/338 |
| 2015/0063255 A1* | 3/2015 | Tandra ............... H04J 11/0023 370/329 |
| 2015/0078354 A1 | 3/2015 | Chen et al. |
| 2016/0249342 A1 | 8/2016 | Hart |
| 2017/0279864 A1 | 9/2017 | Chun et al. |

FOREIGN PATENT DOCUMENTS

| | | |
|---|---|---|
| CN | 102013959 A | 4/2011 |
| CN | 102123514 A | 7/2011 |
| CN | 102714648 A | 10/2012 |
| CN | 102792628 A | 11/2012 |
| CN | 103096439 A | 5/2013 |
| CN | 103428810 A | 12/2013 |
| JP | 2009512387 A | 3/2009 |
| JP | 2016519909 A | 7/2016 |
| KR | 20040024784 A | 3/2004 |
| WO | 2014193547 A1 | 12/2014 |
| WO | 2016032258 A2 | 3/2016 |

OTHER PUBLICATIONS

Jinyoung Chun et al., "Legacy Support on HEW frame structure", Document No. IEEE 11-13/1057r0, Sep. 16, 2013. Total 8 pages. XP002728788.

* cited by examiner

METHOD AND APPARATUS FOR TRANSMITTING WIRELESS LOCAL AREA NETWORK DATA

CROSS-REFERENCE TO RELATED APPLICATIONS

This application is a continuation of International Application No. PCT/CN2014/093869, filed on Dec. 15, 2014, which claims priority to International Application No. PCT/CN2014/072617, filed on Feb. 27, 2014, and International Application No. PCT/CN2014/092960, filed on Dec. 3, 2014, all of which are hereby incorporated by reference in their entireties.

TECHNICAL FIELD

The present invention relates to the field of communications, and in particular, to a method and an apparatus for transmitting wireless local area network data.

BACKGROUND

With the rapid development of communications technologies, a wireless local area network (WLAN) technology based on the IEEE 802.11 standard has been considerably developed and widely applied. A WLAN network may include multiple Access Points (APs) and multiple stations (STAs), where each AP may be associated with multiple STAs, and each AP may transmit, using a radio channel, wireless local area network data with a STA that is associated with the AP.

A current method for transmitting wireless local area network data includes, when the AP sends wireless local area network data to a STA associated with the AP, the AP listens on a radio channel. When the radio channel is not occupied over a period of time, the AP accesses the radio channel and acquires a right to use the radio channel. The AP encapsulates wireless local area network data that needs to be transmitted into a PLCP protocol data unit (PPDU), and sends the PPDU to the STA. When a STA associated with the AP sends wireless local area network data to the AP, the STA listens on the radio channel. When the radio channel is not occupied over a period of time, the STA accesses the radio channel and acquires the right to use the radio channel. The STA encapsulates wireless local area network data that needs to be transmitted into a PPDU and sends the PPDU to the AP.

As shown in FIG. 1 and FIG. 2, the first row of FIG. 1 shows a conventional PPDU frame format, and the second row and the third row of FIG. 1 show a PPDU frame format according to 802.11n. FIG. 2 shows a PPDU frame format according to 802.11 ac. A STA may encapsulate, by using the frame format of FIG. 1 or FIG. 2, wireless local area network data into a PPDU and send the PPDU to an AP. Accordingly, an AP may encapsulate, by using the PPDU frame format of FIG. 1 or FIG. 2, wireless local area network data into a PPDU and send the PPDU to a STA. L-STF, HT-STF, and HT-GF-STF are short training fields, L-LTF, HT-LTF1, HT-LTF, and VHT-LTF are long training fields, L-SIG, HT-SIG, VHT-SIG-A, and VHT-SIG-B are signaling fields, and Data is a data field.

A WLAN network uses a free unauthorized frequency band, and uses a contention-based access mechanism to acquire a right to use a radio channel. When a STA/AP acquires the right to use the radio channel, wireless local area network data is transmitted between the AP and the STA in a one-to-one relationship. However, the wireless local area network data cannot be transmitted between the AP and the STA in a one-to-many relationship, or between the STA and the AP in a many-to-one relationship, which reduces spectrum utilization and network use efficiency.

SUMMARY

To improve spectrum utilization and network use efficiency, embodiments herein provide a method and an apparatus for transmitting wireless local area network data. The technical solutions are as follows:

According to a first aspect, An apparatus for transmitting wireless local area network data, wherein the apparatus comprises non-transitory readable storage medium, which includes several instructions for instructing a processor to perform the following methods:

constructing a radio frame within a scheduling window, the radio frame at least includes a preamble part compatible with the existing IEEE 802.11 (Legacy preamble), a preamble part used in a next-generation IEEE 802.11 standard (HEW preamble), and the first downlink subframe (DL subframe); sending the Legacy preamble, the HEW preamble and the first DL subframe in the radio frame; receiving at least one uplink subframe (UL subframe) located after the first DL subframe within the scheduling window; wherein each of the at least one UL subframes is triggered by one DL subframe located before the UL subframe.

An apparatus for transmitting wireless local area network data, wherein the apparatus comprises non-transitory readable storage medium, which includes several instructions for instructing a processor to perform the following methods:

receiving a radio frame within a scheduling window, the radio frame at least includes a preamble part compatible with the existing IEEE 802.11, Legacy preamble, a preamble part used in a next-generation IEEE 802.11 standard, HEW preamble, and the first downlink subframe, DL subframe; sending at least one uplink subframe, UL subframe, located after the first DL subframe; wherein each of the at least one UL subframes is triggered by one DL subframe located before the UL subframe.

An method for transmitting wireless local area network data, wherein the method comprises:

constructing a radio frame within a scheduling window, the radio frame at least includes a preamble part compatible with the existing IEEE 802.11 (Legacy preamble), a preamble part used in a next-generation IEEE 802.11 standard (HEW preamble), and the first downlink subframe (DL subframe);

sending the Legacy preamble, the HEW preamble and the first DL subframe in the radio frame;

receiving at least one uplink subframe (UL subframe) located after the first DL subframe within the scheduling window; wherein each of the at least one UL subframes is triggered by one DL subframe located before the UL subframe.

In the embodiments herein, when a right to use a radio channel is acquired, an AP may construct a radio frame, and send, in a downlink data domain of the radio frame, wireless local area network data to a STA associated with the AP. In this way, the AP may send the wireless local area network data to the STA associated with the AP, improving spectrum utilization and network use efficiency.

BRIEF DESCRIPTION OF DRAWINGS

To describe the technical solutions in the embodiments herein, the following briefly introduces the accompanying drawings required for describing the embodiments. The accompanying drawings in the following description show merely some embodiments, and a person of ordinary skill in the art may still derive other drawings from these accompanying drawings without creative efforts.

DESCRIPTION OF EMBODIMENTS

To make the objectives, technical solutions, and advantages of the present description clearer, the following further describes the embodiments in detail, with reference to the accompanying drawings.

When a right to use a radio channel is acquired, an AP constructs a radio frame, where the radio frame includes a preamble part, a control domain, and a data domain. The AP in some embodiments constructs the radio frame with a scheduling window. The data domain may include at least one downlink data domain, and the downlink data domain includes multiple radio resource blocks, where each STA associated with the AP has a corresponding radio resource block. The AP may transmit, on a radio resource block corresponding to each STA in the downlink data domain, wireless local area network data to a STA associated with the AP, improving spectrum utilization and network use efficiency.

With reference to multiple embodiments, the following describes solutions and effects in more detail by using a next-generation wireless local area network (WLAN) as an example. In the following embodiments, a quantity of STAs associated with the AP may be one, or may be multiple.

Embodiment 1

Figure 1:
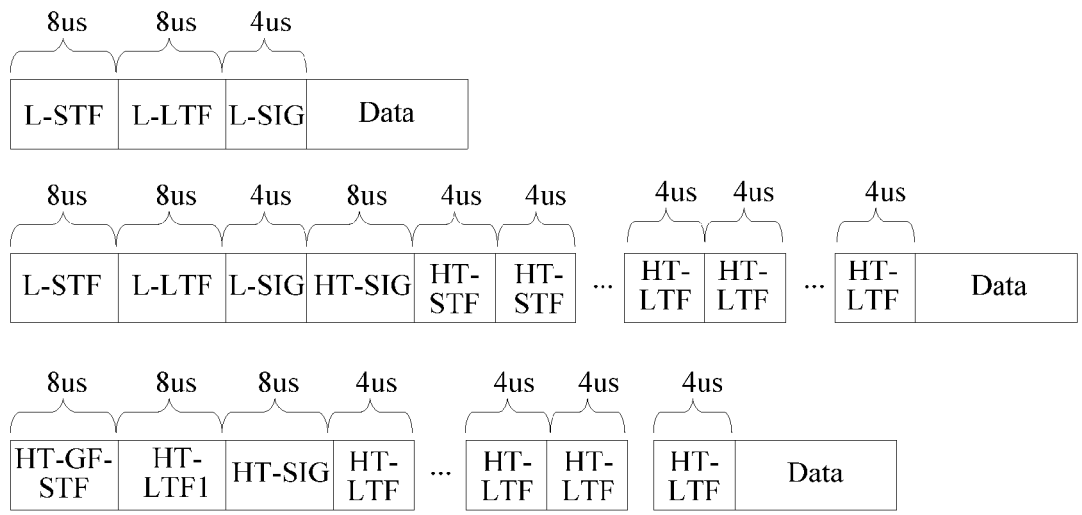
FIG. 1 is a schematic diagram of a PPDU frame format provided in the prior art.
Figure 2:
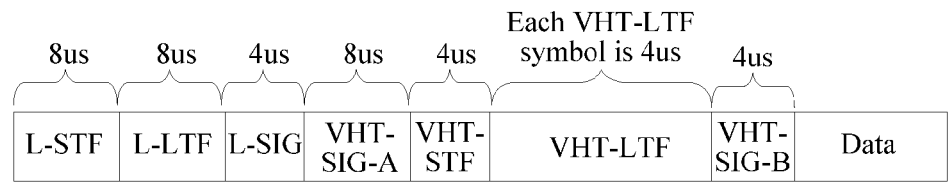
FIG. 2 is a schematic diagram of another PPDU frame format provided in the prior art.
Figure 3:
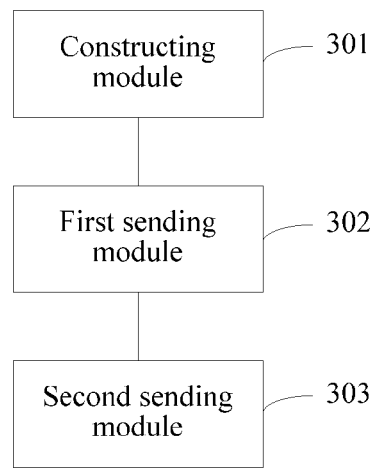
FIG. 3 is a schematic structural diagram of an apparatus for transmitting wireless local area network data according to an embodiment.

FIG. 3 is an apparatus for transmitting wireless local area network data according to an embodiment. Referring to FIG. 3, the apparatus includes:

a constructing module 301, configured to construct a radio frame when a right to use a radio channel is acquired, where the radio frame includes at least a preamble part, a control domain, and a data domain, and the data domain includes at least one downlink data domain;

a first sending module 302, configured to send the preamble part and the control domain to a station STA associated with an access point AP; and a second sending module 303, configured to send, in a downlink data domain of the radio frame, wireless local area network data to the STA associated with the AP.

A preamble of the radio frame may include a preamble part according to an IEEE 802.11 legacy preamble. The preamble may include a preamble part according to a next-generation IEEE 802.11 high efficiency WLAN/WiFi™ (HEW) preamble. Alternatively, the preamble may include both an IEEE 802.11 legacy preamble and a next-generation IEEE 802.11 HEW preamble.

Both the preamble part and the control domain are sent in an orthogonal frequency division multiplexing OFDM manner compatible with the existing Institute of Electrical and Electronics Engineers IEEE 802.11 standard, and the data domain is sent in an orthogonal frequency division multiple access OFDMA manner.

The preamble part is a preamble part compatible with the existing IEEE 802.11, and the preamble part includes a legacy-short training field L-STF, a legacy-long training field L-LTF, and a legacy-signaling field L-SIG, where the L-STF is used to synchronize the STA associated with the AP with the AP, and the L-LTF is used to enable the STA associated with the AP to perform channel estimation, to acquire, by means of coherent reception, information that is related to duration of the radio frame and carried in the L-SIG.

Further, a length LENGTH data domain in the L-SIG domain carries a value related to the duration of the radio frame, and the duration, corresponding to the value, of the radio frame is greater than or equal to actual duration of the radio frame.

Optionally, the apparatus further includes:

an increasing module, configured to increase transmit power of the preamble part of the radio frame, so that a STA not associated with the AP and another AP receive the preamble part of the radio frame, and within reserved duration, the STA not associated with the AP and the another AP no longer transmit wireless local area network data by using the radio channel, where the reserved duration is duration within which the AP owns the right to use the radio channel.

Further, the control domain includes: configuration information of an uplink/downlink data domain in the radio frame, an OFDMA modulation parameter used by the data domain, and radio resource allocation indication information for the STA associated with the AP.

The configuration information of the uplink/downlink data domain includes: a quantity of uplink data domains, a quantity of downlink data domains, and transformation information between the uplink data domain and the downlink data domain.

Optionally, the OFDMA modulation parameter used by the data domain includes: channel bandwidth of a system, a used cyclic prefix CP length, a fast Fourier transformation FFT order, and a quantity of available subcarriers.

The radio resource allocation indication information for the STA associated with the AP includes: a first radio resource indication, where the first radio resource indication is used to indicate a radio resource block corresponding to a second radio resource indication used by each scheduled STA to transmit data, or the first radio resource indication is used to indicate a radio resource block used by each scheduled STA to transmit data.

The first radio resource indication includes: a size and a position of a radio resource block indicated by the first radio resource indication, and a modulation and coding scheme and/or a multiple-input multiple-output MIMO transmission manner used on the radio resource block.

Further, the apparatus further includes:

a first receiving module, configured to: when the data domain includes an uplink data domain, receive, in the uplink data domain included in the data domain, according to the control domain, wireless local area network data sent by the STA associated with the AP.

In this embodiment, when a right to use a radio channel is acquired, an AP may construct a radio frame, where a data domain of the radio frame may include at least one downlink data domain, the downlink data domain includes multiple radio resource blocks, and each STA has a corresponding radio resource block. The AP may send, on a radio resource block corresponding to a STA in the downlink data domain, wireless local area network data to a STA associated with the AP. When the data domain of the radio frame includes an uplink data domain, the uplink data domain also includes multiple radio resource blocks, and each STA has a corresponding radio resource block. The STA associated with the AP may send, on a radio resource block corresponding to the STA, wireless local area network data to the AP. Because the AP may be associated with multiple STAs, the wireless local area network data can be transmitted between the AP and the STA in a one-to-many or many-to-one relationship, improving spectrum utilization and network use efficiency.

Embodiment 2

Figure 4:
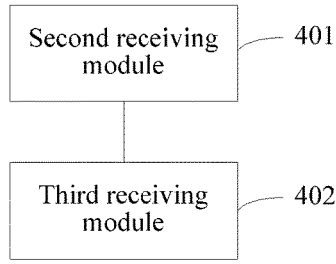
FIG. 4 is a schematic structural diagram of an apparatus for transmitting wireless local area network data according to an embodiment.

FIG. 4 is an apparatus for transmitting wireless local area network data according to an embodiment. Referring to FIG. 4, the apparatus includes:

a second receiving module 401, configured to receive a preamble part and a control domain of a radio frame that are sent by an access point AP associated with a STA; and a third receiving module 402, configured to receive, in a downlink data domain included in a data domain of the radio frame, according to the preamble part and the control domain, wireless local area network data sent by the AP associated with the STA, where the data domain includes at least one downlink data domain.

The preamble part is a preamble part compatible with the existing Institute of Electrical and Electronics Engineers IEEE 802.11, and the preamble part includes a legacy-short training field L-STF, a legacy-long training field L-LTF, and a legacy-signaling field L-SIG; and accordingly, the apparatus further includes:

a synchronization module, configured to perform, according to the L-STF, synchronization with the AP associated with the STA;

a channel estimation module, configured to perform channel estimation according to the L-LTF; and an acquiring module, configured to acquire, by means of coherent reception, information that is related to duration of the radio frame and carried in the L-SIG.

Further, a length LENGTH data domain in the L-SIG domain carries a value related to the duration of the radio frame, and the duration, corresponding to the value, of the radio frame is greater than or equal to actual duration of the radio frame.

The control domain includes: configuration information of an uplink/downlink data domain in the radio frame, an OFDMA modulation parameter used by the data domain, and radio resource allocation indication information for the STA associated with the AP.

The configuration information of the uplink/downlink data domain includes: a quantity of uplink data domains, a quantity of downlink data domains, and transformation information between the uplink data domain and the downlink data domain.

Optionally, the OFDMA modulation parameter used by the data domain includes: channel bandwidth of a system, a used cyclic prefix CP length, a fast Fourier transformation FFT order, and a quantity of available subcarriers.

The radio resource allocation indication information for the STA associated with the AP includes: a first radio resource indication, where the first radio resource indication is used to indicate a radio resource block corresponding to a second radio resource indication used by each scheduled STA to transmit data, or the first radio resource indication is used to indicate a radio resource block used by each scheduled STA to transmit data.

The first radio resource indication includes: a size and a position of a radio resource block indicated by the first radio resource indication, and a modulation and coding scheme and/or a multiple-input multiple-output MIMO transmission manner used on the radio resource block.

Further, the apparatus further includes:

a third sending module, configured to: when the data domain includes an uplink data domain, send, in the uplink data domain included in the data domain, according to the control domain, wireless local area network data to the AP associated with the STA.

In this embodiment, when a right to use a radio channel is acquired, an AP may construct a radio frame, where a data domain of the radio frame may include at least one downlink data domain, the downlink data domain includes multiple radio resource blocks, and each STA has a corresponding radio resource block. The AP may send, on a radio resource block corresponding to a STA in the downlink data domain, wireless local area network data to a STA associated with the AP. When the data domain of the radio frame includes an uplink data domain, the uplink data domain also includes multiple radio resource blocks, and each STA has a corresponding radio resource block. The STA associated with the AP may send, on a radio resource block corresponding to the STA, wireless local area network data to the AP. Because the AP may be associated with multiple STAs, the wireless local area network data can be transmitted between the AP and the STA in a one-to-many or many-to-one relationship, improving spectrum utilization and network use efficiency.

Embodiment 3

Figure 5:
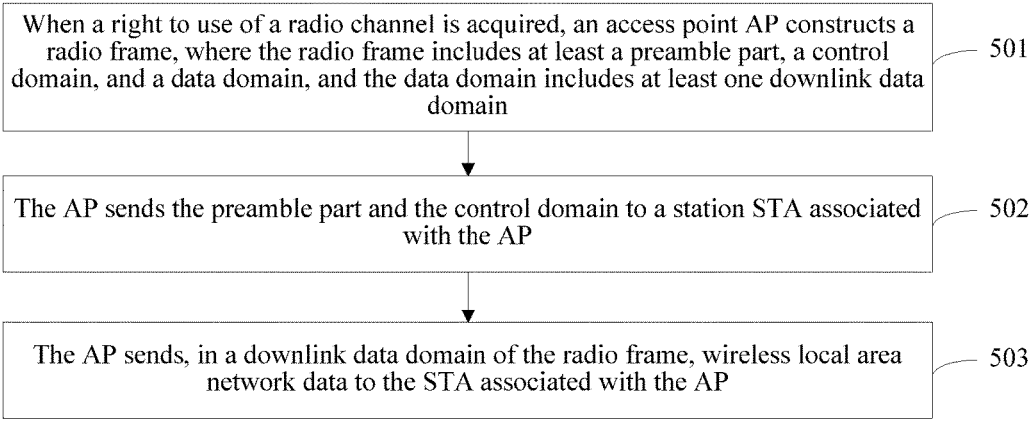
FIG. 5 is a flowchart of a method for transmitting wireless local area network data according to an embodiment.

FIG. 5 is a method for transmitting wireless local area network data according to an embodiment. Referring to FIG. 5, the method includes:

Step 501: When a right to use a radio channel is acquired, an access point AP constructs a radio frame, where the radio frame includes at least a preamble part, a control domain, and a data domain, and the data domain includes at least one downlink data domain.

Step 502: The AP sends the preamble part and the control domain to a station STA associated with the AP.

Step 503: The AP sends, in a downlink data domain of the radio frame, wireless local area network data to the STA associated with the AP.

Both the preamble part and the control domain are sent in an orthogonal frequency division multiplexing OFDM manner compatible with the existing Institute of Electrical and Electronics Engineers IEEE 802.11 standard, and the data domain is sent in an orthogonal frequency division multiple access OFDMA manner.

The preamble part is a preamble part compatible with the existing IEEE 802.11, and the preamble part includes a legacy-short training field L-STF, a legacy-long training field L-LTF, and a legacy-signaling field L-SIG, where the L-STF is used to synchronize the STA associated with the AP with the AP, and the L-LTF is used to enable the STA associated with the AP to perform channel estimation, to acquire, by means of coherent reception, information that is related to duration of the radio frame and carried in the L-SIG.

Further, a length LENGTH data domain in the L-SIG domain carries a value related to the duration of the radio frame, and the duration, corresponding to the value, of the radio frame is greater than or equal to actual duration of the radio frame.

Optionally, the method further includes:

increasing, by the AP, transmit power of the preamble part of the radio frame, so that a STA not associated with the AP and another AP receive the preamble part of the radio frame, and within reserved duration, the STA not associated with the AP and the another AP no longer transmit wireless local area network data by using the radio channel, where the reserved duration is duration within which the AP owns the right to use the radio channel.

The control domain includes: configuration information of an uplink/downlink data domain in the radio frame, an OFDMA modulation parameter used by the data domain, and radio resource allocation indication information for the STA associated with the AP.

The configuration information of the uplink/downlink data domain includes: a quantity of uplink data domains, a quantity of downlink data domains, and transformation information between the uplink data domain and the downlink data domain.

Further, the OFDMA modulation parameter used by the data domain includes: channel bandwidth of a system, a used cyclic prefix CP length, a fast Fourier transformation FFT order, and a quantity of available subcarriers.

The radio resource allocation indication information for the STA associated with the AP includes: a first radio resource indication, where the first radio resource indication is used to indicate a radio resource block corresponding to a second radio resource indication used by each scheduled STA to transmit data, or the first radio resource indication is used to indicate a radio resource block used by each scheduled STA to transmit data.

The first radio resource indication includes: a size and a position of a radio resource block indicated by the first radio resource indication, and a modulation and coding scheme and/or a multiple-input multiple-output MIMO transmission manner used on the radio resource block.

Optionally, the method further includes:

when the data domain includes an uplink data domain, receiving, by the AP, in the uplink data domain included in the data domain, according to the control domain, wireless local area network data sent by the STA associated with the AP.

In this embodiment, when a right to use a radio channel is acquired, an AP may construct a radio frame, where a data domain of the radio frame may include at least one downlink data domain, the downlink data domain includes multiple radio resource blocks, and each STA has a corresponding radio resource block. The AP may send, on a radio resource block corresponding to a STA in the downlink data domain, wireless local area network data to a STA associated with the AP. When the data domain of the radio frame includes an uplink data domain, the uplink data domain also includes multiple radio resource blocks, and each STA has a corresponding radio resource block. The STA associated with the AP may send, on a radio resource block corresponding to the STA, wireless local area network data to the AP. Because the AP may be associated with multiple STAs, the wireless local area network data can be transmitted between the AP and the STA in a one-to-many or many-to-one relationship, improving spectrum utilization and network use efficiency.

Embodiment 4

Figure 6:
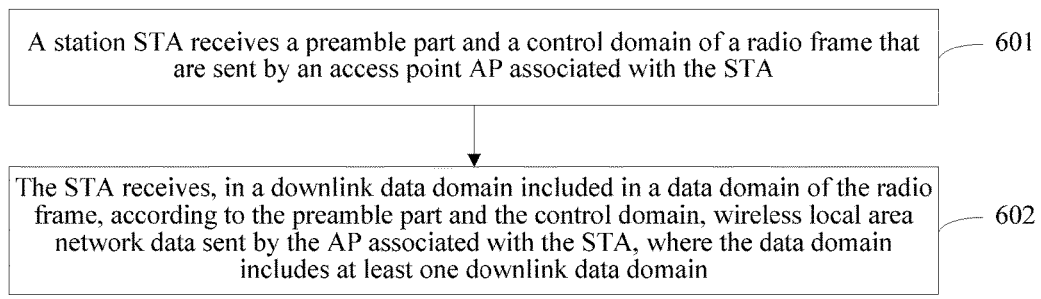
FIG. 6 is a flowchart of a method for transmitting wireless local area network data according to an embodiment.

FIG. 6 is a method for transmitting wireless local area network data according to an embodiment. Referring to FIG. 6, the method includes:

Step 601: A station STA receives a preamble part and a control domain of a radio frame that are sent by an access point AP associated with the STA.

Step 602: The STA receives, in a downlink data domain included in a data domain of the radio frame, according to the preamble part and the control domain, wireless local area network data sent by the AP associated with the STA, where the data domain includes at least one downlink data domain.

The preamble part is a preamble part compatible with the existing Institute of Electrical and Electronics Engineers IEEE 802.11, and the preamble part includes a legacy-short training field L-STF, a legacy-long training field L-LTF, and a legacy-signaling field L-SIG; and accordingly, after the receiving, by a station STA, a preamble part and a control domain of a radio frame that are sent by an access point AP associated with the STA, the method further includes:

performing, by the STA according to the L-STF, synchronization with the AP associated with the STA;

performing, by the STA, channel estimation according to the L-LTF; and acquiring, by the STA by means of coherent reception, information that is related to duration of the radio frame and carried in the L-SIG.

A length LENGTH data domain in the L-SIG domain carries a value related to the duration of the radio frame, and the duration, corresponding to the value, of the radio frame is greater than or equal to actual duration of the radio frame.

Further, the control domain includes: configuration information of an uplink/downlink data domain in the radio frame, an OFDMA modulation parameter used by the data domain, and radio resource allocation indication information for the STA associated with the AP.

The configuration information of the uplink/downlink data domain includes: a quantity of uplink data domains, a quantity of downlink data domains, and transformation information between the uplink data domain and the downlink data domain.

Further, the OFDMA modulation parameter used by the data domain includes: channel bandwidth of a system, a used cyclic prefix CP length, a fast Fourier transformation FFT order, and a quantity of available subcarriers.

The radio resource allocation indication information for the STA associated with the AP includes: a first radio resource indication, where the first radio resource indication is used to indicate a radio resource block corresponding to a second radio resource indication used by each scheduled STA to transmit data, or the first radio resource indication is used to indicate a radio resource block used by each scheduled STA to transmit data.

The first radio resource indication includes: a size and a position of a radio resource block indicated by the first radio resource indication, and a modulation and coding scheme and/or a multiple-input multiple-output MIMO transmission manner used on the radio resource block.

Optionally, the method further includes:

when the data domain includes an uplink data domain, sending, by the STA, in the uplink data domain included in the data domain, according to the control domain, wireless local area network data to the AP associated with the STA.

In this embodiment, when a right to use a radio channel is acquired, an AP may construct a radio frame, where a data domain of the radio frame may include at least one downlink data domain, the downlink data domain includes multiple radio resource blocks, and each STA has a corresponding radio resource block. The AP may send, on a radio resource block corresponding to a STA in the downlink data domain, wireless local area network data to a STA associated with the AP. When the data domain of the radio frame includes an uplink data domain, the uplink data domain also includes multiple radio resource blocks, and each STA has a corresponding radio resource block. The STA associated with the AP may send, on a radio resource block corresponding to the STA, wireless local area network data to the AP. Because the AP may be associated with multiple STAs, the wireless local area network data can be transmitted between the AP and the STA in a one-to-many or many-to-one relationship, improving spectrum utilization and network use efficiency.

Embodiment 5

Figure 7:
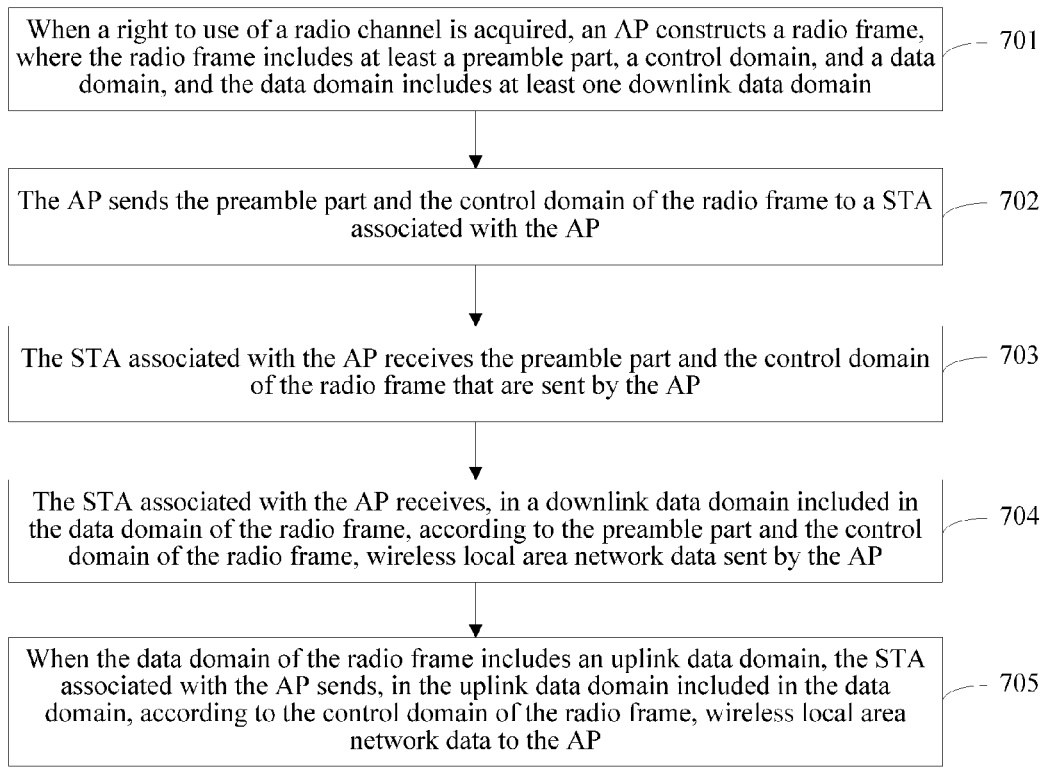
FIG. 7 is a flowchart of a method for transmitting wireless local area network data according to an embodiment.

FIG. 7 is a method for transmitting wireless local area network data according to an embodiment. Referring to FIG. 7, the method includes:

Step 701: When a right to use a radio channel is acquired, an AP constructs a radio frame, where the radio frame includes at least a preamble part, a control domain, and a data domain, and the data domain includes at least one downlink data domain.

A specific operation of acquiring a right to use a radio channel may be: listening on the radio channel, and detecting energy of the radio channel. When it is detected that the energy of the radio channel is less than a preset threshold, and it is detected that n NAV (Network Allocation Vector, network allocation vector) is not set, it is determined that the radio channel is not occupied at a current moment. After a random backoff time, if the radio channel is still not occupied, access is made to the radio channel, to acquire the right to use the radio channel.

Both the AP and a STA associated with the AP may acquire the right to use the radio channel. After the STA associated with the AP acquires the right to use the radio channel, the STA associated with the AP sends a notification message to the AP to notify the AP.

Further, when the right to use the radio channel is acquired, the AP may further construct a reserved control frame according to an address of the AP and reserved duration, where the reserved duration is duration during which the AP owns the right to use the radio channel. The AP broadcasts the reserved control frame, to state that the AP and the STA associated with the AP use the radio channel within nearest reserved duration after a current time.

The AP broadcasts the reserved control frame, so that after receiving the reserved control frame, a STA not associated with the AP and another AP may no longer acquire the right to use the radio channel within the nearest reserved duration after the current time, avoiding impact caused on the AP and the STA associated with the AP by the STA not associated with the AP and the another AP.

It should be noted that the reserved duration may be preset, or may be configured by the AP, which is not specifically limited in this embodiment.

Optionally, when the right to use the radio channel is acquired, the AP may further group the reserved duration as at least one radio frame. In the at least one radio frame obtained by means of grouping, duration of each radio frame and duration of a SIFS (Short Inter-Frame Space, short inter-frame space) are pre-configured. The duration of the SIFS is a time interval between two neighboring radio frames. When a radio frame ends, the AP continues to listen to the duration of the SIFS of the radio channel, and if the radio channel is not occupied within the duration of the SIFS, the AP constructs a next radio frame.

Figure 8:
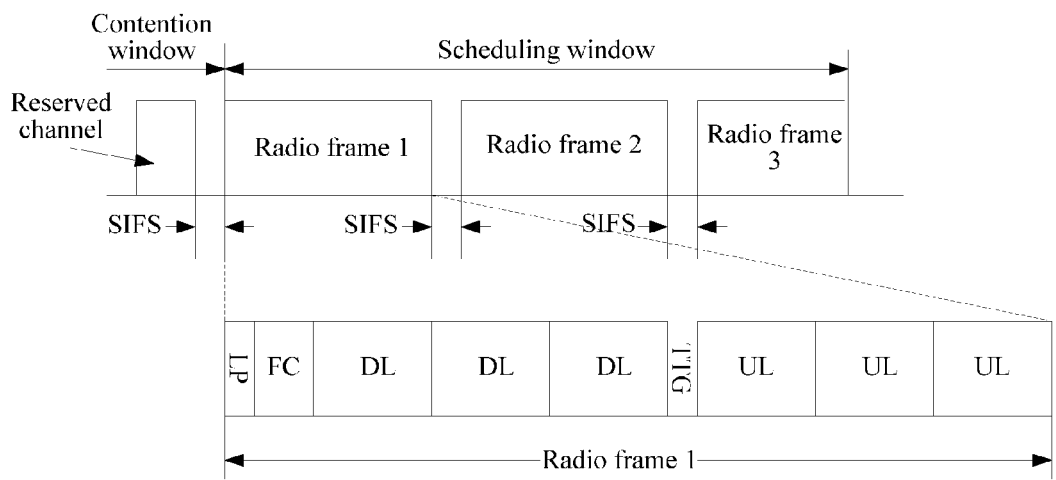
FIG. 8 is a schematic diagram of a frame format of a radio frame according to an embodiment.

As shown in FIG. 8, the AP and the STA associated with the AP may acquire the right to use the radio channel in a contention window in a CSMA/CA (Carrier Sense Multiple Access/Collision Avoidance, carrier sense multiple access/collision avoidance) manner. When the right to use the radio channel is acquired, the AP may broadcast the reserved control frame in a reserved channel in FIG. 8, to reserve the radio channel. After the AP reserves the radio channel, the AP enters a scheduling window, where a time length of the scheduling window is reserved duration. The AP may group the reserved duration as at least one radio frame.

In this embodiment, not only the AP may construct the radio frame according to a quantity of STAs associated with the AP, but also the AP may construct the radio frame according to a service between the AP and the STA associated with the AP. Certainly, the AP may also construct the radio frame in another manner, which is not specifically limited in this embodiment.

The radio frame includes at least a preamble part, a control domain, and a data domain, and the data domain includes at least one downlink data domain. When the data domain not only includes a downlink data domain, but also includes an uplink data domain, a TTG (Transmit/receive Transition Gap, Transmit/receive Transition Gap) is set between the uplink data domain and the downlink data domain, for example, a size of the TTG may be 16 us. As shown in the bottom half of FIG. 8, LP is a preamble part, FC is a control domain, DL is a downlink data domain, and UL is an uplink data domain. DL, UL, and TTG in FIG. 8 construct the data domain of the radio frame.

Further, a sum of quantities of uplink data domains and downlink data domains in the data domain is 6 at most.

The preamble part is a preamble part compatible with the existing IEEE 802.11, and the preamble part includes an L-STF (Legacy-Short Training Field, legacy-short training field), an L-LTF (Legacy-Long Training Field, legacy-long training field), and an L-SIG (Legacy-Signal Field, legacy-signaling field), where the L-STF is used to synchronize a STA associated with an AP with the AP, and the L-LTF is used to enable the STA associated with the AP to perform channel estimation, to acquire, by means of coherent reception, information that is related to duration of the radio frame and carried in the L-SIG.

The foregoing mentioned existing IEEE 802.11 may be IEEE 802.11a, IEEE 802.11g, IEEE 802.11n or IEEE 802.11ac.

A LENGTH (that is, length) data domain in the L-SIG domain carries a value related to the duration of the radio frame, and the value is greater than or equal to actual duration of the radio frame.

Further, the L-SIG domain further includes a rate. A time length may be calculated according to the rate and the length. The rate and the length that are included in the L-SIG domain may be used to configure group information of a receiver.

For example, if the value is 4095, it is calculated according to the rate included in the L-SIG domain that the data 4095 is corresponding to 5464 us, and 5464 us is duration of the control domain and the data domain. If the duration of the preamble part is 20 us, maximum duration of the radio frame is 5484 us.

The quantities of uplink data domains and downlink data domains in the radio frame may be configured, and duration of each uplink/downlink data domain is pre-configured, for example, the duration of each uplink/downlink data domain may be 896 us. If an uplink data domain exists in the radio frame, a time interval, that is, a TTG, is needed for transformation between the downlink data domain and the uplink data domain, where duration of the TTG may be 16 us, and the TTG may ensure the transformation between the downlink data domain and the uplink data domain. The duration of the control domain is 48 us or 44 us. When the duration of the control domain is 48 us, the control domain includes 12 OFDM (Orthogonal Frequency Division Multiplexing, orthogonal frequency division multiplexing) symbols, and when the duration of the control domain is 44 us, the control domain may include 11 OFDM symbols, where the OFDM symbol herein is set by using an OFDM parameter of 802.11 ac. It is set according to the foregoing parameter that, when the duration of the control domain is 48 us, a maximum duration of a radio frame is 5484 us; or when the duration of the control domain is 44 us, a maximum duration of a radio frame is 5480 us.

Figure 9:
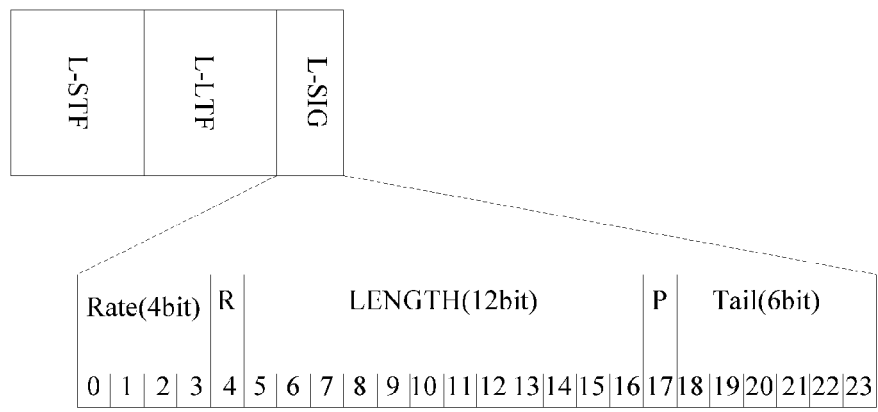
FIG. 9 is a schematic diagram of a preamble part of a radio frame according to an embodiment.

As shown in FIG. 9, the L-SIG in the preamble part may represent a packet length by using 12 bits, which means that a maximum packet length that can be represented by the L-SIG field is limited to 12 bits. A lowest MCS (Modulation and Coding Scheme, modulation and coding scheme) represented by a rate Rate part is BPSK (Binary Phase Shift Keying, binary phase shift keying) modulation. By using the BPSK modulation and the packet length represented by 12 bits, maximum duration of a next packet may be calculated. A tail Tail is used to clear a channel coder, and a register of a decoder.

Further, the control domain includes: configuration information of an uplink/downlink data domain in the radio frame, an OFDMA modulation parameter used by the data domain, and radio resource allocation indication information for the STA associated with the AP.

The configuration information of the uplink/downlink data domain may include: a quantity of uplink data domains, a quantity of downlink data domains, and transformation information between the uplink data domain and the downlink data domain.

The quantities of uplink data domains and downlink data domains in the radio frame may be configured according to a service between the AP and the STA associated with the AP. Certainly, the AP may further select a configuration manner from multiple pre-configured configuration manners according to the service between the AP and the STA associated with the AP. For example, as shown in the following Table 1, Table 1 shows multiple configuration manners, where D in Table 1 represents a downlink data domain, and U represents an uplink data domain; and Table 1 further shows a size of a value in LENGTH included in an L-SIG corresponding to each configuration manner. Because the duration of the control domain may be 48 us, or may be 44 us, Table 1 shows a size of a value in LENGTH1 corresponding to 48 us, and shows a size of a value in LENGTH2 corresponding to 44 us.

TABLE 1

| Configuration manner | | | | | | LENGTH1 48 us control domain | LENGTH2 44 us control domain |
|---|---|---|---|---|---|---|---|
| D |   |   |   |   |   | 708 | 704 |
| D | U |   |   |   |   | 1394 | 1392 |
| D | U | U |   |   |   | 2070 | 2067 |
| D | U | U | U |   |   | 2745 | 2742 |
| D | U | U | U | U |   | 3418 | 3415 |
| D | U | U | U | U | U | 4094 | 4092 |
| D | D |   |   |   |   | 1382 | 1378 |
| D | D | U |   |   |   | 2070 | 2067 |
| D | D | U | U |   |   | 2745 | 2742 |
| D | D | U | U | U |   | 3418 | 3415 |
| D | D | U | U | U | U | 4094 | 4092 |
| D | D | D |   |   |   | 2056 | 2055 |
| D | D | D | U |   |   | 2745 | 2742 |
| D | D | D | U | U |   | 3418 | 3415 |
| D | D | D | U | U | U | 4094 | 4092 |
| D | D | D | D |   |   | 2733 | 2730 |
| D | D | D | D | U |   | 3418 | 3415 |
| D | D | D | D | U | U | 4094 | 4092 |
| D | D | D | D | D |   | 3408 | 3405 |
| D | D | D | D | D | U | 4094 | 4092 |
| D | D | D | D | D | D | 4084 | 4080 |

Further, positions of the uplink data domains and the downlink data domains in the radio frame may also be configured.

The OFDMA modulation parameter used by the data domain may include: channel bandwidth of a system, a used CP (Cyclic Prefix, cyclic prefix) length, an FFT (Fast Fourier Transformation, fast Fourier transformation) order, and a quantity of available subcarriers.

The used CP length may also be configured according to a scenario in which the AP is deployed. When scenarios are quite different, channel conditions are also quite different. For example, the AP may be deployed indoors or outdoors. Different channel conditions also require different CP lengths. Selection of a CP length is a compromise result of resource overheads and system performance. When an indoor channel exists between an AP and a STA, multipath spread is small; and in this case, using a relatively long CP may cause reduction of resource utilization. When an outdoor channel or an outdoor to indoor channel exists between an AP and a STA, multipath spread is large; and in this case, using a relatively short CP may cause reduction of system performance. Therefore, a fixed CP length may fail to meet deployment of all or most of scenarios. The AP needs to indicate, according to different deployment scenarios, to use different CP lengths. For example, in an indoor scenario, a CP of 0.8 us is used; in a UMi (Urban Micro, Urban Micro) scenario, a CP length is 4.4 us; and in a UMa (Urban Macro, Urban Macro) scenario, a CP length is 6.4 us. The AP selects a corresponding CP length according to the scenario in which the AP is deployed, and indicates the corresponding CP length in the control domain. For example, if a system only supports indoor and UMi scenarios, 1-bit information in the control domain is used for indication, indicating that 0 represents using 0.8 us, and indicating that 1 represents using 4.8 us; if the system further needs to support a UMa scenario, 2-bit information in the control domain needs to be used for indication, indicating that 00 represents using 0.8 us, indicating that 01 represents using 4.4 us, and indicating that 02 represents using a CP of 6.4 us.

The radio resource allocation indication information for the STA associated with the AP includes: a first radio resource indication, where the first radio resource indication is used to indicate a radio resource block corresponding to a second radio resource indication used by each scheduled STA to transmit data, or the first radio resource indication is used to indicate a radio resource block used by each scheduled STA to transmit data.

The first radio resource indication includes: a size and a position of a radio resource block indicated by a first radio resource and a modulation and coding scheme and/or an MIMO (Multi-input Multi-output, multiple-input multiple-output) transmission manner used on the radio resource block.

Step 702: The AP sends the preamble part and the control domain of the radio frame to a STA associated with the AP.

The preamble part and the control domain are different components of the radio frame, and the AP may first send the preamble part of the radio frame to the STA associated with the AP, and then send the control domain of the radio frame to the STA associated with the AP.

Optionally, when the AP sends the preamble part of the radio frame to the STA associated with the AP, the AP broadcasts the preamble part of the radio frame, so that not only the STA associated with the AP can receive the preamble part of the radio frame, but also a STA not associated with the AP can receive the preamble part of the radio frame. When the AP broadcasts the preamble part of the radio frame, the AP may increase transmit power of the preamble part of the radio frame, so that the STA not associated with the AP and another AP receive the preamble part of the radio frame, and within reserved duration, the STA not associated with the AP and the another AP no longer transmit wireless local area network data by using the radio channel. For example, in a case in which a peak-to-average rate is met, the transmit power of the preamble part of the radio frame may be increased by 2 dB.

By increasing the transmit power of the preamble part of the radio frame, a STA not associated with the AP and another AP may better receive the preamble part of the radio frame, and thereby the STA not associated with the AP and the another AP no longer transmit wireless local area network data by using the radio channel, avoiding interference to transmission of wireless local area network data between the AP and the STA associated with the AP when the STA not associated with the AP and the another AP transmit wireless local area network data, and achieving a relatively good effect.

Both the preamble part and the control domain are sent in an OFDM manner compatible with the existing IEEE 802.11 standard.

The existing IEEE 802.11 may be IEEE 802.11a, IEEE 802.11g, IEEE 802.11n or IEEE 802.11ac.

When the preamble part and the control domain are sent, the preamble part and the control domain may be configured and sent according to an OFDM configuration parameter. For example, as shown in Table 2, a first value column in Table 2 is an OFDM configuration parameter for configuring the preamble part and control domain, and a second value column is an OFDMA configuration parameter of an uplink data domain and a downlink data domain.

Further, duration of each downlink data domain or uplink data domain may be 900 us, and when a second value in Table 2 is used to perform OFDMA modulation, each uplink or downlink data domain includes 30 OFDM symbols.

Optionally, when the second value in Table 2 is used to perform OFDMA modulation, each radio resource block may include 192 resource units occupied by 32 subcarriers and six OFDM symbols; in this case, one uplink or downlink data domain includes a total of 70 radio resource blocks. Alternatively, each radio resource block may also include 160 resource units occupied by 16 subcarriers and 10 OFDM symbols; in this case, one uplink or downlink data domain includes a total of 84 radio resource blocks.

TABLE 2

|  | Unit | First value | Second value |
|---|---|---|---|
| Bandwidth | MHz | 20 | 20 |
| FFT order |  | 64 | 512 |
| Subcarrier interval | KHz | 312.5 | 39.0625 |
| OFDM symbol length | us | 3.2 | 25.6 |
|  | Sampling point | 64 | 512 |
| CP length | us | 0.8 | 4.4 |
|  | Sampling point | 16 | 80 |
| Available subcarrier |  | 56 | 448 |

Step 703: The STA associated with the AP receives the preamble part and the control domain of the radio frame that are sent by the AP.

The AP first sends the preamble part of the radio frame, and then sends the control domain of the radio frame; therefore, the STA associated with the AP first receives the preamble part, sent by the AP, of the radio frame, and then receives the control domain, sent by the AP, of the radio frame.

Step 704: The STA associated with the AP receives, in a downlink data domain included in the data domain of the radio frame, according to the preamble part and the control domain of the radio frame, wireless local area network data sent by the AP.

When the STA associated with the AP receives the preamble part of the radio frame, the STA synchronizes, according to the L-STF in the preamble part, with the AP associated with the STA, and performs channel estimation according to the L-LTF of the preamble part; and the STA acquires, by means of coherent reception, information that is related to duration of the radio frame and carried in the L-SIG of the preamble part of the radio frame.

The STA associated with the AP determines, according to configuration information, included in the control domain, of an uplink/downlink data domain in the radio frame, an OFDMA (Orthogonal Frequency Division Multiple Access, orthogonal frequency division multiple access) modulation parameter used by the data domain, and radio resource allocation indication information for the STA associated with the AP, a resource block corresponding to the STA in the downlink data domain in the data domain and a transmission parameter used for sending data of the resource block (for example, in an MCS or MIMO manner), and receives and demodulates, on the determined resource block, the wireless local area network data sent by the AP.

The data domain is sent in an OFDMA manner.

Step 705: When the data domain of the radio frame includes an uplink data domain, the STA associated with the AP sends, in the uplink data domain included in the data domain, according to the control domain of the radio frame, wireless local area network data to the AP.

A specific operation of the sending, by the STA associated with the AP, in the uplink data domain included in the data domain, according to the control domain of the radio frame, wireless local area network data to the AP may be: performing, by the STA associated with AP, modulation and coding, according to the control domain of the radio frame, on wireless local area network data that needs to be sent, and sending, on a resource block corresponding to the STA, coded wireless local area network data to the AP.

A specific operation of the performing, by the STA associated with the AP, modulation and coding, according to the control domain of the radio frame, wireless local area network data that needs to be sent may be that: performing, by the STA associated with AP, according to an OFDM modulation parameter included in the control domain of the radio frame, configuration information, included in the control domain, of an uplink/downlink data domain in the radio frame, and radio resource allocation indication information for the STA associated with the AP, modulation and coding on the wireless local area network data that needs to be sent, determining a corresponding resource block of the STA in the uplink data domain, and sending, on the determined resource block, wireless local area network data on which modulation and coding are performed to the AP.

Further, before the reserved duration ends, if the AP wants to end the scheduling window, that is, the AP gives up the right to use the radio channel, the AP may broadcast a giving up control frame, to state that the AP gives up the right to use the radio channel. In this case, another AP or STA may acquire, in a contention manner, the right to use the radio channel.

In this embodiment, when a right to use a radio channel is acquired, an AP may construct a radio frame, where the radio frame includes a preamble part, a control domain, and a data domain. The AP may increase transmit power of the preamble part, and broadcast the preamble part, so that not only a STA associated with the AP receives the preamble part, but also a STA not associated with the AP and another AP may receive the preamble part, and thereby the STA not associated with the AP and the another AP no longer transmit wireless local area network data by using the radio channel, avoiding interference to transmission of wireless local area network data between the AP and the STA associated with the AP when the STA not associated with the AP and the another AP transmit wireless local area network data, and achieving a relatively good effect. In addition, because the data domain of the radio frame may include multiple uplink data domains and multiple downlink data domains, and each uplink data domain or downlink data domain includes multiple radio resource blocks, each STA has a corresponding radio resource block. The STA associated with the AP may send, on a radio resource block corresponding to the STA in an uplink data domain, wireless local area network data to the AP. The AP may send, on a radio resource block corresponding to a STA in a downlink data domain, wireless local area network data to the STA associated with the AP. Because the AP may be associated with multiple STAs, the wireless local area network data can be transmitted between the AP and the STA in a one-to-many or many-to-one relationship, improving spectrum utilization and network use efficiency.

Embodiment 6

Figure 10:
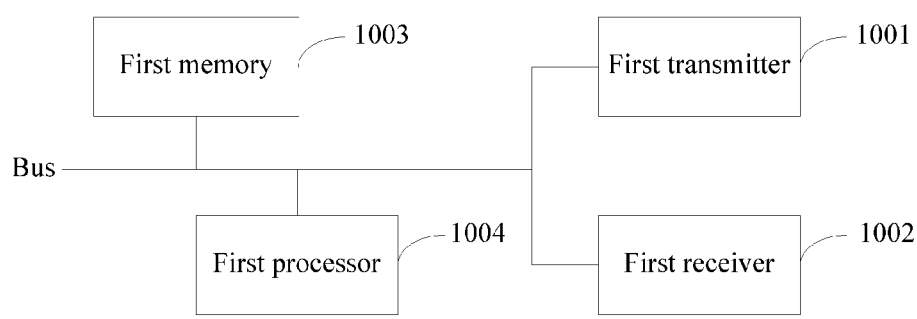
FIG. 10 is a schematic structural diagram of an apparatus for transmitting wireless local area network data according to an embodiment.

FIG. 10 is an apparatus for transmitting wireless local area network data according to an embodiment. Referring to FIG. 10, the apparatus includes: a first transmitter 1001, a first receiver 1002, a first memory 1003, and a first processor 1004, which are configured to execute the following method for transmitting wireless local area network data, where:

the first processor 1004 is configured to construct a radio frame when a right to use a radio channel is acquired, where the radio frame includes at least a preamble part, a control domain, and a data domain, and the data domain includes at least one downlink data domain;

the first transmitter 1001 is configured to send the preamble part and the control domain to a station STA associated with the AP; and the first transmitter 1001 is further configured to send, in a downlink data domain of the radio frame, wireless local area network data to the STA associated with the AP.

Both the preamble part and the control domain are sent in an orthogonal frequency division multiplexing OFDM manner compatible with the existing Institute of Electrical and Electronics Engineers IEEE 802.11 standard, and the data domain is sent in an orthogonal frequency division multiple access OFDMA manner.

The preamble part is a preamble part compatible with the existing IEEE 802.11, and the preamble part includes a legacy-short training field L-STF, a legacy-long training field L-LTF, and a legacy-signaling field L-SIG, where the L-STF is used to synchronize the STA associated with the AP with the AP, and the L-LTF is used to enable the STA associated with the AP to perform channel estimation, to acquire, by means of coherent reception, information that is related to duration of the radio frame and carried in the L-SIG.

Optionally, a length LENGTH data domain in the L-SIG domain carries a value related to the duration of the radio frame, and the duration, corresponding to the value, of the radio frame is greater than or equal to actual duration of the radio frame.

Further, the first processor 1004 is further configured to increase transmit power of the preamble part of the radio frame, so that a STA not associated with the AP and another AP receive the preamble part of the radio frame, and within reserved duration, the STA not associated with the AP and the another AP no longer transmit wireless local area network data by using the radio channel, where the reserved duration is duration within which the AP owns the right to use the radio channel.

The control domain includes: configuration information of an uplink/downlink data domain in the radio frame, an OFDMA modulation parameter used by the data domain, and radio resource allocation indication information for the STA associated with the AP.

The configuration information of the uplink/downlink data domain includes: a quantity of uplink data domains, a quantity of downlink data domains, and transformation information between the uplink data domain and the downlink data domain.

Further, the OFDMA modulation parameter used by the data domain includes: channel bandwidth of a system, a used cyclic prefix CP length, a fast Fourier transformation FFT order, and a quantity of available subcarriers.

The radio resource allocation indication information for the STA associated with the AP includes: a first radio resource indication, where the first radio resource indication is used to indicate a radio resource block corresponding to a second radio resource indication used by each scheduled STA to transmit data, or the first radio resource indication is used to indicate a radio resource block used by each scheduled STA to transmit data.

Optionally, the first radio resource indication includes: a size and a position of a radio resource block indicated by the first radio resource indication, and a modulation and coding scheme and/or a multiple-input multiple-output MIMO transmission manner used on the radio resource block.

Optionally, the first receiver 1002 is further configured to: when the data domain includes an uplink data domain, receive, in the uplink data domain included in the data domain, according to the control domain, wireless local area network data sent by the STA associated with the AP.

In this embodiment, when a right to use a radio channel is acquired, an AP may construct a radio frame, where a data domain of the radio frame may include at least one downlink data domain, the downlink data domain includes multiple radio resource blocks, and each STA has a corresponding radio resource block. The AP may send, on a radio resource block corresponding to a STA in the downlink data domain, wireless local area network data to a STA associated with the AP. When the data domain of the radio frame includes an uplink data domain, the uplink data domain also includes multiple radio resource blocks, and each STA has a corresponding radio resource block. The STA associated with the AP may send, on a radio resource block corresponding to the STA, wireless local area network data to the AP. Because the AP may be associated with multiple STAs, the wireless local area network data can be transmitted between the AP and the STA in a one-to-many or many-to-one relationship, improving spectrum utilization and network use efficiency.

Embodiment 7

Figure 11:
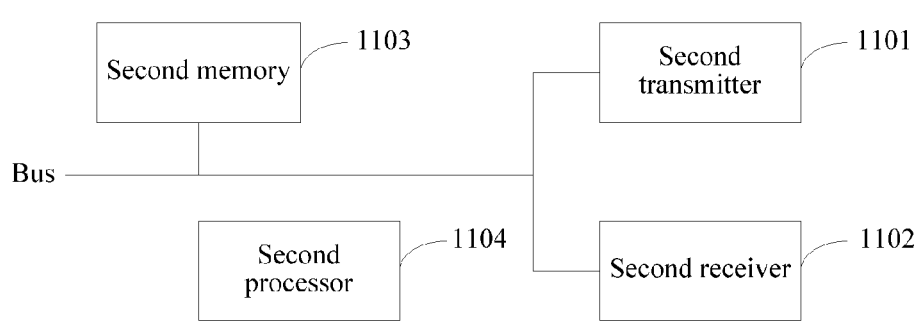
FIG. 11 is a schematic structural diagram of an apparatus for transmitting wireless local area network data according to an embodiment.
Figure 12:
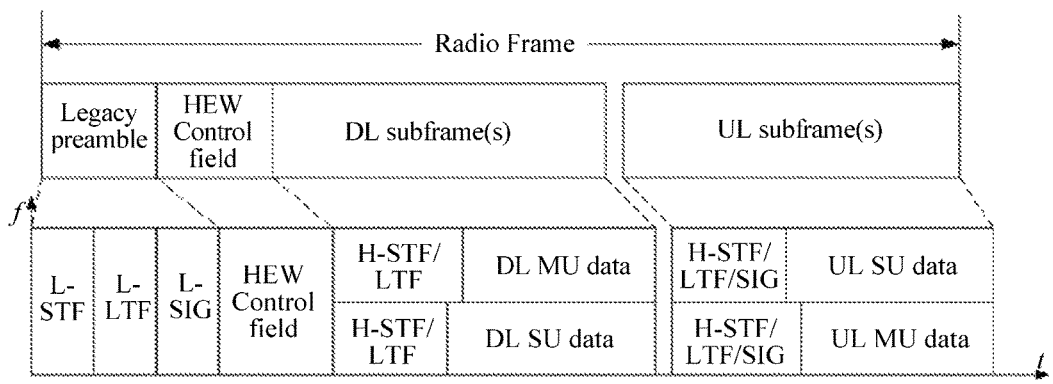
FIG. 12 is a schematic diagram of a frame format of a radio frame according to an embodiment.

FIG. 11 is an apparatus for transmitting wireless local area network data according to an embodiment. Referring to FIG. 11, the apparatus includes: a second transmitter 1101, a second receiver 1102, a second memory 1103, and a second processor 1104, which are configured to execute the following method for transmitting wireless local area network data, where:

the second receiver 1102 is configured to receive a preamble part and a control domain of a radio frame that are sent by an access point AP associated with the STA; and the second receiver 1102 is further configured to receive, in a downlink data domain included in a data domain of the radio frame, according to the preamble part and the control domain, wireless local area network data sent by the AP associated with the STA, where the data domain includes at least one downlink data domain.

The preamble part is a preamble part compatible with the existing Institute of Electrical and Electronics Engineers IEEE 802.11, and the preamble part includes a legacy-short training field L-STF, a legacy-long training field L-LTF, and a legacy-signaling field L-SIG; and accordingly, the second processor 1104 is configured to perform, according to the L-STF, synchronization with the AP associated with the STA;

the second processor 1104 is further configured to perform channel estimation according to the L-LTF; and the second receiver 1102 is further configured to acquire, by means of coherent reception, information that is related to duration of the radio frame and carried in the L-SIG.

A length LENGTH data domain in the L-SIG domain carries a value related to the duration of the radio frame, and the duration, corresponding to the value, of the radio frame is greater than or equal to actual duration of the radio frame.

Further, the control domain includes: configuration information of an uplink/downlink data domain in the radio frame, an OFDMA modulation parameter used by the data domain, and radio resource allocation indication information for the STA associated with the AP.

Optionally, the configuration information of the uplink/downlink data domain includes: a quantity of uplink data domains, a quantity of downlink data domains, and transformation information between the uplink data domain and the downlink data domain.

The OFDMA modulation parameter used by the data domain includes: channel bandwidth of a system, a used cyclic prefix CP length, a fast Fourier transformation FFT order, and a quantity of available subcarriers.

Optionally, the radio resource allocation indication information for the STA associated with the AP includes: a first radio resource indication, where the first radio resource indication is used to indicate a radio resource block corresponding to a second radio resource indication used by each scheduled STA to transmit data, or the first radio resource indication is used to indicate a radio resource block used by each scheduled STA to transmit data.

Further, the first radio resource indication includes: a size and a position of a radio resource block indicated by the first radio resource indication, and a modulation and coding scheme and/or a multiple-input multiple-output MIMO transmission manner used on the radio resource block.

Optionally, the second transmitter 1101 is configured to: when the data domain includes an uplink data domain, send, in the uplink data domain included in the data domain, according to the control domain, wireless local area network data to the AP associated with the STA.

In this embodiment, when a right to use a radio channel is acquired, an AP may construct a radio frame, where a data domain of the radio frame may include at least one downlink data domain, the downlink data domain includes multiple radio resource blocks, and each STA has a corresponding radio resource block. The AP may send, on a radio resource block corresponding to a STA in the downlink data domain, wireless local area network data to a STA associated with the AP. When the data domain of the radio frame includes an uplink data domain, the uplink data domain also includes multiple radio resource blocks, and each STA has a corresponding radio resource block. The STA associated with the AP may send, on a radio resource block corresponding to the STA, wireless local area network data to the AP. Because the AP may be associated with multiple STAs, the wireless local area network data can be transmitted between the AP and the STA in a one-to-many or many-to-one relationship, improving spectrum utilization and network use efficiency.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments, but are not intended to limit the disclosure. Any modification, equivalent replacement, and improvement made without departing from the spirit and principle shall fall within the protection scope of the present disclosure.

It should further be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

Based on the description of the foregoing implementation manners, a person skilled in the art may clearly understand that the embodiments disclosed herein may be implemented by software in addition to necessary universal hardware, where the universal hardware includes a universal integrated circuit, a universal CPU, a universal memory, a universal component, or the like, or may be implemented by dedicated hardware, including an application-specific integrated circuit, a dedicated CPU, a dedicated memory, a dedicated component, or the like. Based on such an understanding, the technical solutions disclosed herein may be implemented in a form of a software product. The computer software product is stored in a readable storage medium, for example, various media that can store software program code, such as a USB flash drive, a removable hard disk, a read-only memory (ROM, Read-Only Memory), a random access memory (RAM, Random Access Memory), a magnetic disk, or an optical disc, and includes several instructions for instructing a computer device (which may be a personal computer, a server, a network device, or the like) to perform the methods described in the embodiments.

The foregoing description enables a person skilled in the art to implement or use the disclosed embodiments. Various modifications to the embodiments are obvious to a person skilled in the art, and general principles defined in this specification may be implemented in other embodiments without departing from the spirit or scope of the disclosure. Therefore, the present innovation will not be limited to the embodiments described in this specification but extends to the widest scope that complies with the principles and novelty provided in this specification.

The following describes some specific implementation manners by way of example only.

Figure 8A:
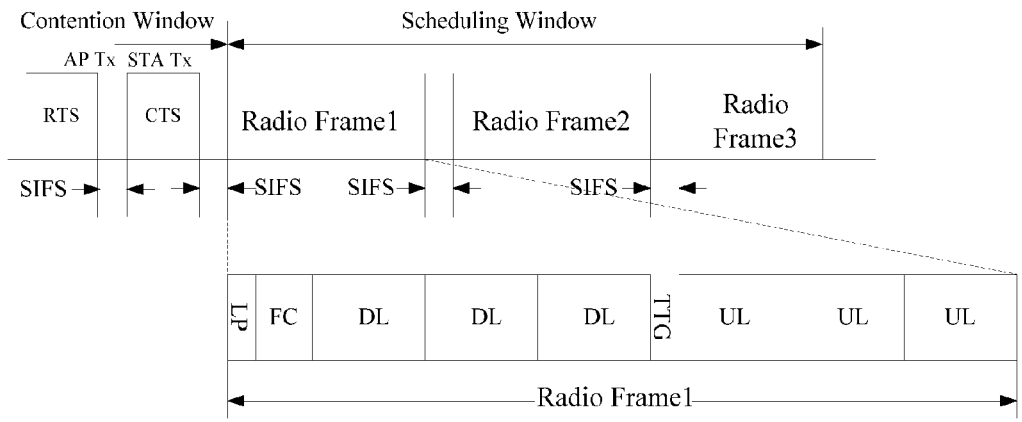
FIG. 8a-8c respectively is a schematic diagram of a frame format of a radio frame according to an embodiment.

For details of a "reserved channel part" in a contention window shown above in FIG. 8, refer to FIG. 8a. Specifically, before the constructing, by an AP, a radio frame after obtaining through contention a right to use a channel, the method further includes: sending, by the AP, an RTS (English: Request To Send), and receiving one or more CTSs (English: Clear To Send) that one or more STAs associated with the AP reply with, where the one or more CTSs are used to indicate that a STA sending the CTS can receive or send data, (a channel condition allows receiving and sending of data). More specifically, when receiving the CTS, other communications nodes nearby do not use the channel to perform communication. That is, the STA protects, by sending the CTS, the channel from being used by the communications nodes nearby, to avoid causing interference.

More specifically, a receiver address of the RTS sent by the AP may be a group address, or may be an address of a specified STA, or may be addresses of all STAs associated with the AP. For example, the receiver address is represented by a default address, for example, by all zeros. After a STA that performs reception as instructed by the AP (that is, a STA indicated by the receiver address) receives the RTS, the STA replies with a CTS after a period of time, for example, after duration of an SIFS. For example, for a group of STAs in the STAs associated with the AP, particular STAs specified by the AP or all STAs reply with a CTS separately. Such replies may be sent by using a time division, code division, frequency division, or OFDMA technology, or may be superposed and sent on exactly a same resource.

As mentioned above, not only the AP may construct the radio frame according to a quantity of STAs associated with the AP, but also the AP may construct the radio frame according to a service between the AP and the STA associated with the AP. Certainly, the AP may also construct the radio frame in another manner. Specifically, the AP may determine, according to a received CTS, what kind of radio frame is to be constructed. For example, the AP determines, according to a quantity of received CTSs, a quantity of STAs that can be scheduled, and further determines scheduling duration or a quantity of radio frames to be scheduled, and a quantity of downlink subframes and a quantity of uplink subframes in a radio frame or a ratio of downlink subframes to uplink subframes in a radio frame. Further, if the STAs reply with the CTS in a group manner, the AP may further determine whether MU-MIMO transmission may be used in a radio frame, and determine how many resources may be allocated to perform MU-MIMO transmission, so as to determine an internal structure of the radio frame. For another example, the AP determines a transmission MCS in a scheduling period according to signal strength of the received CTS, so as to determine scheduling duration or a quantity of radio frames to be scheduled.

In frame structures shown in FIG. 8, FIG. 8a, and FIG. 9, there may be multiple specific frame structure replacing manners. For example, in the disclosed embodiments, a radio frame includes in sequence: a preamble part compatible with the existing IEEE 802.11 (hereinafter briefly referred to as Legacy preamble), a preamble part used in a next-generation standard (for example, HEW preamble), and the first downlink subframe, or may include another downlink subframe or an uplink subframe. The another downlink subframe or uplink subframe includes a training sequence field part of the next-generation standard, such as HEW STF and HEW LTF parts, and data, and does not include the preamble part compatible with the existing IEEE 802.11.

In various frame structures provided by the disclosed embodiments, a radio frame includes: one or more downlink subframes and one or more uplink subframes. In this way, on the basis of the frame structure mentioned in the previous paragraph, a downlink subframe and an uplink subframe are alternated, the first subframe after the alternation includes a Legacy preamble and a preamble used in a next-generation standard (for example, HEW preamble). For example, after the TTG mentioned above, and before the first uplink data, the first subframe includes a Legacy preamble and a preamble used in a next-generation standard (for example, HEW preamble). Remaining non-first downlink subframes and non-first uplink subframes include a training sequence field part of the next-generation standard, for example, HEW STF and HEW LTF parts, and do not include the Legacy preamble and another part in the preamble of the next-generation standard.

In various frame structures provided by this implementation manner, a radio frame includes ACK information for a downlink subframe of the radio frame. For example, in a radio frame, ACK information for a downlink subframe is carried in a subsequent uplink subframe after the downlink subframe. These uplink subframes may be default. For example, the first uplink subframe or the first several uplink subframes after the downlink subframe carry the ACK information for the downlink subframe. In an example, the first UL subframe is used as an ACK reply, and the second and third UL subframes are used for transmission of uplink data payload. Certainly, these uplink subframes may also be indicated to an uplink STA by the AP in advance.

In a more specific example, after the uplink subframe that carries the ACK information for the downlink subframe, a radio frame includes a downlink subframe, where the downlink subframe is used to trigger transmission of a subsequent uplink subframe that carries data (payload), and the downlink subframe may carry information such as a resource allocation indicator, for example, resource block information of the subsequent uplink subframe. The downlink subframe may include only a legacy preamble and a preamble of a next-generation standard, for example, an HEW preamble, or may include a MAC PDU part besides the foregoing two parts.

It is also mentioned in the foregoing implementation manners that, the configuration information of the uplink/downlink data domain may include: a quantity of uplink data domains, a quantity of downlink data domains, and transformation information between the uplink data domain and the downlink data domain. It should be noted that, the configuration information of the uplink/downlink data domain may have multiple specific forms, which are not limited in the implementation manners of the disclosed embodiments.

Figure 8B:
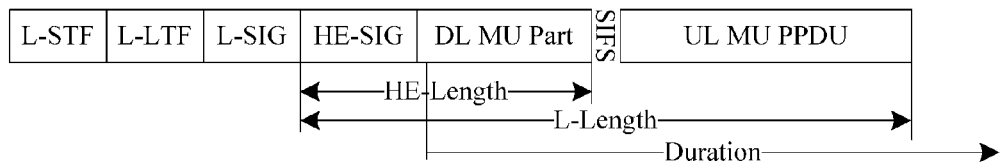

For example, referring to a schematic diagram of a data structure in FIG. 8b, in an implementation manner, Length in an L-SIG of a PPDU, that is, L-Length, is used to indicate a sum of lengths of an uplink data domain and a downlink data domain (downlink subframe and uplink subframe), and an HE-SIG includes information indicating a length of a downlink subframe (which, for example, may be named HE-Length). With this structure, downlink transmission and uplink transmission are fully protected.

For a WLAN system using the foregoing data structure, a receive end performs the following processing after receiving a PPDU:

Step 1: Read an L-Length carried in an L-SIG of the PPDU, to obtain a sum of lengths of a current downlink subframe (that is, the current PPDU) and an uplink subframe (uplink PPDU).

Step 2: After it is learned that a current frame is a frame of an HE type, learn a length of the current downlink subframe (that is, the current PPDU) according to length information HE-Length carried in an HE-SIG.

Step 3: Further, obtain a length of an uplink subframe (such as an UL MU PPDU) according to the L-Length and the HE-Length. Specifically, Length of the uplink subframe=L-Length−HE-Length−SIFS.

In a more specific example, for a receive end (HE receive end) using the foregoing data structure, if only downlink data needs to be received, signal receiving or CCA detection may be stopped within a time of the length of the uplink subframe obtained in step 3. In this way, obviously, power can be reduced to some extent. If the receive end needs to send uplink data, the length of the uplink subframe obtained in step 3 is a limit or threshold for the receive end to send uplink data, that is, a length of data sent by the receive end needs to be less than the calculated length of the uplink subframe (UL MU PPDU).

After receiving the PPDU, another receive end (non-HE receive end) reads the L-Length carried in the L-SIG of the PPDU, and uses the L-Length as a length of the current frame (PPDU). Within a time indicated by the length, the non-HE receive end does not actively send data, to avoid causing interference to current transmission, or may no longer receive a signal or may stop CCA detection. In this way, obviously, power can also be reduced to some extent.

Further, length units of the L-length, the HE-Length, and the SIFS are unified or consistent, and are, for example, time, a quantity of bits, or a quantity of OFDM/OFDMA symbols.

For example, one method is to use time, for example, microsecond (μs), as the unit. Specifically, the L-length indicates a sum of time lengths of a downlink PPDU, an uplink PPDU, and an inter-frame space; the HE-Length indicates a time length of a downlink PPDU. Another method is to use an existing unit of the L-Length, that is, byte, as the unit.

In a specific example, a specific calculation method includes:

$$T_{L\text{-}Length} = T_{DL\_PPDU} + T_{UL\_PPDU} + SIFS + T_{HE\text{-}SIG}$$

$$T_{HE\text{-}Length} = T_{DL\_PPDU} + T_{HE\text{-}SIG}$$

$$L\text{-}Length = \text{ceiling}[T_{L\text{-}Length}/T_{symbol}] * N_{symbol},$$

where a unit of $N_{symbol}$ is byte, which refers to a quantity of bytes included in each symbol; and $$HE\text{-}Length = \text{ceiling}[T_{HE\text{-}Length}/T_{symbol}] * N_{symbol}$$

If a quantity of OFDM/OFDMA symbols is used as a unit of length (length), $$L\text{-}Length = \text{ceiling}[T_{L\text{-}Length}/T_{symbol}] \text{ and}$$

$$HE\text{-}Length = \text{ceiling}[T_{HE\text{-}Length}/T_{symbol}]$$

In the foregoing formulas, TL-Length is a time length indicated by the L-Length, $T_{DL\_PPDU}$ is a time length required for sending a DL PPDU, $T_{UL\_PPDU}$ is a time length required for sending an UL PPDU, SIFS is a short interframe space (Short Inter-frame Space), $T_{HE\text{-}Length}$ is a time length indicated by the HE-Length, $T_{HE\text{-}SIG}$ is a time length required for sending an HE-SIG, $T_{symbol}$ is a time length required for sending an OFDM symbol, and Ceiling[x] is a round-up operation performed on x.

Figure 8C:
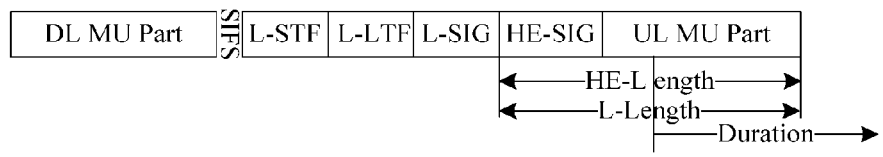

In addition, refer to FIG. 8c, which is a schematic structural diagram of an uplink subframe sent by a STA. An L-Length in an L-SIG of the uplink subframe (uplink PPDU) is used to indicate a length of a multi-user part (uplink MU PPDU, including an HE-SIG and an uplink MU Part) of the uplink subframe. In this way, uplink transmission can be better protected.

In a specific example, in the uplink PPDU, by using a length unit being μs as an example, $T_{L\text{-}Length} = T_{UL\_PPDU} - 20$, where 20 is a length of a legacy preamble (Legacy Preamble).

Further, the uplink subframe sent by the STA may further include uplink resource allocation information (Resource Allocation) sent by an AP, and specifically, the uplink resource allocation information may be included in the HE-SIG of the sent uplink subframe.

On the basis of the foregoing data structure, after receiving the uplink subframe, a non-destination HE STA may perform the following processing:

Step 1: Read an L-Length to learn duration of the current frame.

Step 2: Continue to read an HE-SIG to learn uplink resource allocation information, and read Duration in a MAC header in a resource block according to the uplink resource allocation information.

Step 3: The non-destination HE STA can learn current TXOP duration and effectively set a NAV according to the Duration information.

Duration indicates a time length of a current TXOP; therefore, its length is not limited to the current frame.

For the uplink subframe, the uplink subframe can be better protected by using the L-Length and/or Duration in the HE-SIG.

If the STA needs to distinguish whether a current frame is an uplink subframe or a downlink subframe, a distinguishing method is to compare lengths of the L-Length and the HE-Length. For example, if the two are equal or approximate, it is determined that the current frame is an uplink subframe; and if the two are not equal or differ significantly, it is determined that the current frame is a downlink subframe.

What is claimed is:

1. An access point for transmitting wireless local area network (WLAN) data, the access point comprising:
   a non-transitory memory storage comprising instructions; and
   one or more processors in communication with the memory, wherein the one or more processors are configured to execute the instructions to facilitate:
      constructing a radio frame within a scheduling window, wherein the radio frame at least includes a preamble part compatible with an existing IEEE 802.11 legacy preamble, a preamble part used in a next-generation IEEE 802.11 high efficiency WLAN/WiFi™ (HEW) preamble, and a first downlink (DL) subframe;
      sending the legacy preamble, the HEW preamble, and the first DL subframe in the radio frame; and
      receiving at least one uplink (UL) subframe located after the first DL subframe within the scheduling window, wherein each of the at least one UL subframe is triggered by a respective DL subframe located before the respective UL subframe;
   wherein sending of the preamble parts of the radio frame is performed at an increased transmit power to facilitate reception of the preamble parts of the radio frame by one or more stations not associated with the access point and/or by one or more other access points, such that the one or more stations not associated with the access point and/or the one or more other access points do not transmit WLAN data during a reserved duration corresponding to the access point.

2. The access point according to claim 1, wherein a first UL subframe located after any DL subframe includes: a legacy preamble and a HEW preamble.

3. The access point according to claim 1, wherein the one or more processors are further configured to execute the instructions to facilitate:
   sending at least one DL subframe located after the first DL subframe, wherein a first DL subframe located after any UL subframe includes a legacy preamble and a HEW preamble.

4. The access point according to claim 3, wherein the one or more processors are further configured to execute the instructions to facilitate:
   alternately sending a UL subframe and receiving a DL subframe.

5. The access point according to claim 1, wherein the existing IEEE 802.11 legacy preamble corresponds to IEEE 802.11a, IEEE 802.11g, IEEE 802.11n, or IEEE 802.11ac; and wherein the next-generation IEEE 802.11 standard corresponds to the next-generation IEEE 802.11 standard of IEEE 802.11ac.

6. The access point according to claim 1, wherein sending the legacy preamble, the HEW preamble, and the first DL subframe in the radio frame comprises sending the legacy preamble, the HEW preamble, and the first DL subframe in the radio frame to multiple stations.

7. A station for transmitting wireless local area network (WLAN) data, the station comprising:
   a non-transitory memory storage comprising instructions; and
   one or more processors in communication with the memory, wherein the one or more processors are configured to execute the instructions to facilitate:
      receiving a radio frame within a scheduling window, wherein the radio frame at least includes a preamble part compatible with an existing IEEE 802.11 legacy preamble, a preamble part used in a next-generation IEEE 802.11 high efficiency WLAN/WiFi™ (HEW) preamble, a control domain, and a first downlink (DL) subframe; and
      sending at least one uplink (UL) subframe, located after the first DL subframe, wherein each of the at least one UL subframe is triggered by a respective DL subframe located before the respective UL subframe;
   wherein the control domain of the radio frame includes configuration information of a data domain in the radio frame, an orthogonal frequency division multiplexing (OFDM) modulation parameter for the data domain of the radio frame, and radio resource allocation indication information for the station.

8. The station according to claim 7, wherein a first UL subframe located after any DL subframe includes a legacy preamble and a HEW preamble.

9. The station according to claim 7, wherein the one or more processors are further configured to execute the instructions to facilitate:
   receiving at least one DL subframe after the first DL subframe, wherein a first DL subframe located after any UL subframe includes: a legacy preamble and a HEW preamble.

10. The station according to claim 9, wherein the one or more processors are further configured to execute the instructions to facilitate:
    alternately receiving a UL subframe and sending a DL subframe.

11. The station according to claim 7, wherein the existing IEEE 802.11 legacy preamble corresponds to IEEE 802.11a, IEEE 802.11g, IEEE 802.11n, or IEEE 802.11ac; and wherein the next-generation IEEE 802.11 standard corresponds to the next-generation IEEE 802.11 standard of IEEE 802.11ac.

12. A method for transmitting wireless local area network (WLAN) data, wherein the method comprises:
    constructing, by an access point, a radio frame within a scheduling window, wherein the radio frame at least includes a preamble part compatible with an existing IEEE 802.11 legacy preamble, a preamble part used in a next-generation IEEE 802.11 high efficiency WLAN/WiFi™ (HEW) preamble, and a first downlink (DL) subframe;
    sending, by the access point, the legacy preamble, the HEW preamble, and the first DL subframe in the radio frame; and
    receiving, by the access point, at least one uplink (UL) subframe located after the first DL subframe within the scheduling window, wherein each of the at least one UL subframe is triggered by a respective DL subframe located before the respective UL subframe;

wherein sending of the preamble parts of the radio frame is performed at an increased transmit power to facilitate reception of the preamble parts of the radio frame by one or more stations not associated with the access point and/or by one or more other access points, such that the one or more stations not associated with the access point and/or the one or more other access points do not transmit WLAN data during a reserved duration corresponding to the access point.

13. The method according to claim 12, wherein a first UL subframe located after any DL subframe includes a legacy preamble and a HEW preamble.

14. The method according to claim 12, the method further comprising:

sending at least one DL subframe located after the first DL subframe, wherein a first DL subframe located after any UL subframe includes a legacy preamble and a HEW preamble.

15. The method according to claim 14, wherein UL and DL subframes are alternated.

16. The method according to claim 12, wherein the existing IEEE 802.11 legacy preamble corresponds to IEEE 802.11a, IEEE 802.11g, IEEE 802.11n, or IEEE 802.11ac; and wherein the next-generation IEEE 802.11 standard corresponds to the next-generation IEEE 802.11 standard of IEEE 802.11ac.

17. A method for transmitting wireless local area network data (WLAN), wherein the method comprises:

receiving, by a station, a radio frame within a scheduling window, wherein the radio frame includes at least a preamble part compatible with an existing IEEE 802.11 legacy preamble, a preamble part used in a next-generation IEEE 802.11 high efficiency WLAN/WiFi™ (HEW) preamble, a control domain, and a first downlink (DL) subframe; and sending, by the station, at least one uplink (UL) subframe located after the first DL subframe, wherein each of the at least one UL subframe is triggered by a respective DL subframe located before the UL subframe;

wherein the control domain of the radio frame includes configuration information of a data domain in the radio frame, an orthogonal frequency division multiplexing (OFDM) modulation parameter for the data domain of the radio frame, and radio resource allocation indication information for the station.

18. The method according to claim 17, wherein a first UL subframe located after any DL subframe includes the IEEE 802.11 legacy preamble and the next-generation IEEE 802.11 HEW preamble.

19. The method according to claim 17, wherein the method further comprises:

receiving at least one DL subframe after the first DL subframe, wherein a first DL subframe located after any UL subframe includes the 802.11 legacy preamble and the next-generation 802.11 HEW preamble.

20. The method according to claim 17, wherein the existing IEEE 802.11 legacy preamble corresponds to IEEE 802.11a, IEEE 802.11g, IEEE 802.11n, or IEEE 802.11ac; and wherein the next-generation IEEE 802.11 standard corresponds to the next-generation IEEE 802.11 standard of IEEE 802.11ac.

21. The method according to claim 19, wherein UL and DL subframes are alternated.

* * * * *